United States Patent [19]

Kuban et al.

[11] Patent Number: 4,459,140

[45] Date of Patent: Jul. 10, 1984

[54] FILTER APPARATUS

[75] Inventors: Daniel P. Kuban; B. Huston Singletary, both of Oak Ridge; John H. Evans, Rockwood, all of Tenn.

[73] Assignee: The United States of America as represented by the United States Department of Energy, Washington, D.C.

[21] Appl. No.: 440,206

[22] Filed: Nov. 8, 1982

[51] Int. Cl.³ .............................................. B01D 46/00
[52] U.S. Cl. ........................................ 55/356; 55/350; 55/481; 55/498; 55/484; 55/502; 55/DIG. 9
[58] Field of Search ................. 55/478, 480, 481, 523, 55/498, 502, 484, 350, DIG. 9, 356; 210/232, 237, 238, 450, 457, 484, 323.2, 341

[56] References Cited

U.S. PATENT DOCUMENTS

| | | | |
|---|---|---|---|
| 2,974,749 | 3/1961 | Donguy | 55/478 |
| 3,080,976 | 3/1963 | Thompson et al. | 210/484 |
| 3,169,844 | 2/1965 | Young | 55/498 |
| 3,339,735 | 9/1967 | Kasten | 210/323.2 |
| 3,342,022 | 9/1967 | Donguy et al. | 55/DIG. 9 |
| 3,546,855 | 12/1970 | Marx | 55/481 |
| 4,304,580 | 12/1981 | Gehl et al. | 55/498 |

FOREIGN PATENT DOCUMENTS 933794  8/1963  United Kingdom ................. 55/478

Primary Examiner—Bernard Nozick
Attorney, Agent, or Firm—Edwin D. Grant; Stephen D. Hamel; Michael F. Esposito

[57] ABSTRACT

A plurality of holding tubes are respectively mounted in apertures in a partition plate fixed in a housing receiving gas contaminated with particulate material. A filter cartridge is removably held in each holding tube, and the cartridges and holding tubes are arranged so that gas passes through apertures therein and across the partition plate while particulate material is collected in the cartridges. Replacement filter cartridges are respectively held in holding canisters mounted on a support plate which can be secured to the aforesaid housing, and screws mounted on said canisters are arranged to push replacement cartridges into the cartridge holding tubes and thereby eject used cartridges therefrom.

6 Claims, 3 Drawing Figures

FILTER APPARATUS

BACKGROUND OF THE INVENTION

This invention, which was made under a contract with the U.S. Department of Energy, relates to a gas filtering apparatus advantageous for use in a nuclear fuel reprocessing system.

A voloxidizer is basically a rotary kiln in which tritium is evaporated from spent nuclear fuel during the reclamation of useful components therein, the tritium advantageously being isolated is a gas before chemical processing steps are performed. The tritium gas from a voloxidizer contains fuel particulates which must be collected and returned to the fuel reprocessing stream, and filters which have previously been used for this purpose are excessively large and also difficult to replace.

SUMMARY OF THE INVENTION

It is therefore an object of this invention to provide an effective gas filtering apparatus.

A specific object of the invention to provide a gas filtering apparatus which has a large filtering area and low pressure drop while being compact.

An additional object of the invention is to provide a gas filtering apparatus which has multiple filter cartridges which can conveniently be replaced without requiring a worker to enter a contaminated area in which the cartridges are used.

These objects are achieved by a preferred embodiment of the invention comprising holding tubes mounted in a housing which receives tritium and other gases from a voloxidizer, filter cartridges respectively held in the holding tubes, and a replacement cartridge assembly arranged to push replacement cartridges from canisters into the holding tubes and thereby eject used cartridges therefrom.

DESCRIPTION OF THE PREFERRED EMBODIMENT OF THE INVENTION

Figure 1:
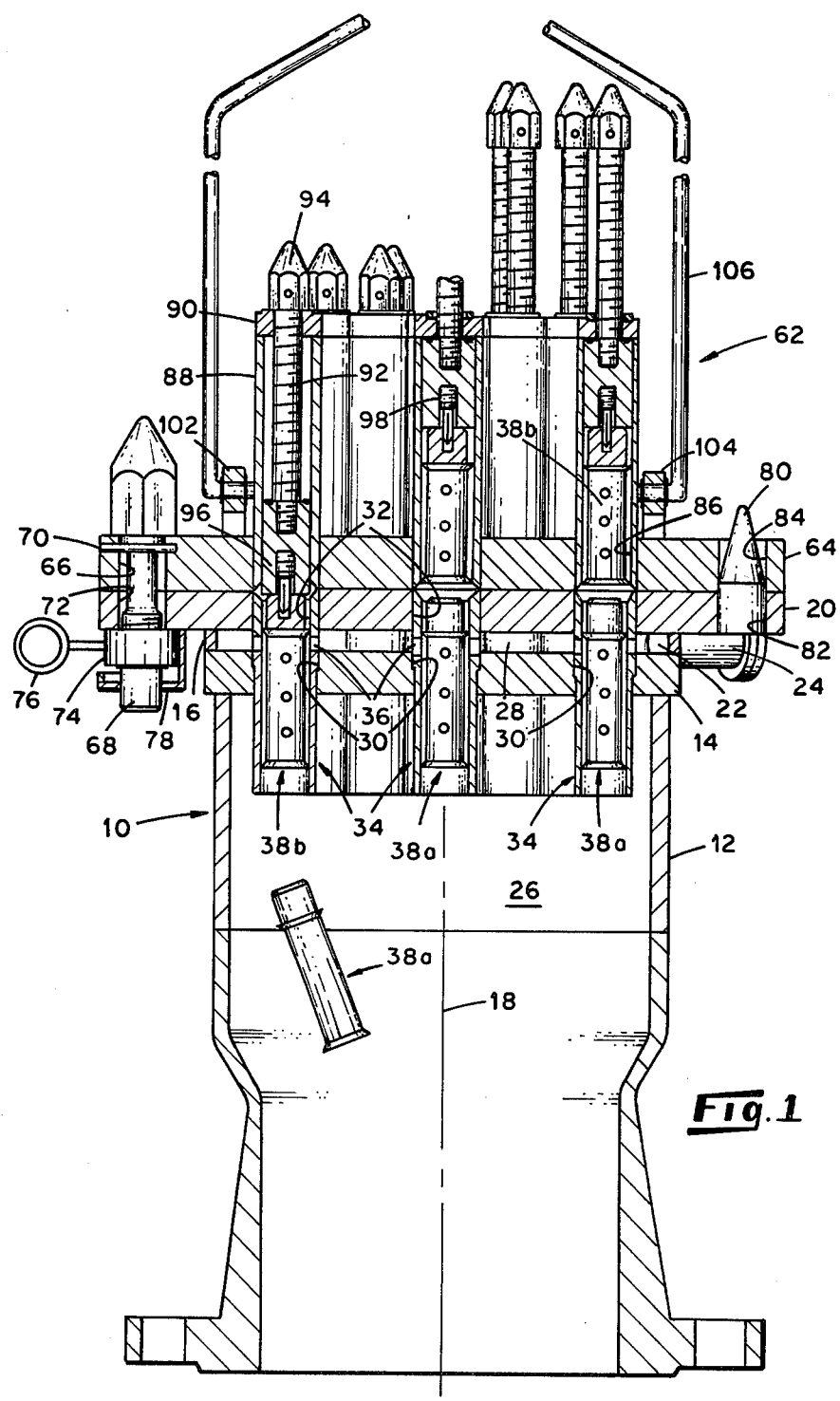
FIG. 1 is a longitudinal sectional view of a preferred embodiment of the invention.
Figure 2:
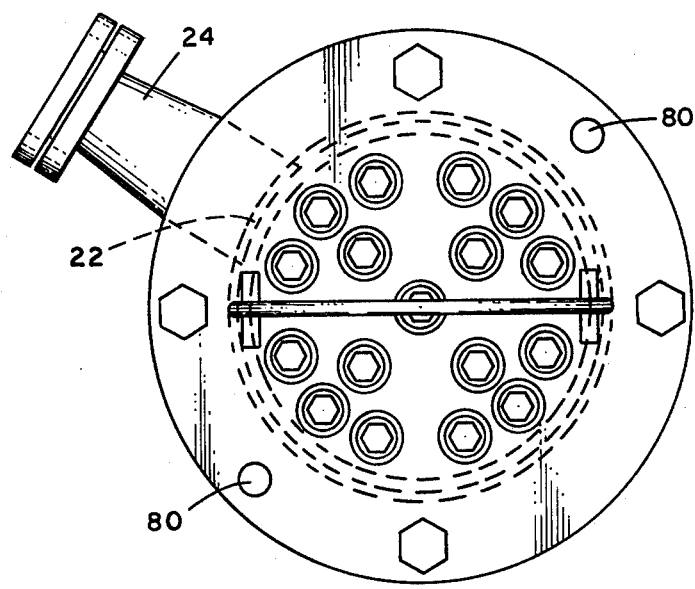
FIG. 2 is a top plan view of components of the same embodiment of the invention.

In the drawings, reference number 10 generally designates a housing comprising a lower, vertically disposed tube 12 having a disk-shaped partition plate 14 welded to its upper end, a short upper tube 16 which is welded to and projects upwardly from said partition plate and is centered on the longitudinal axis 18 of tube 12, and a disk-shaped end plate 20 which is welded to the upper end of tube 16 and projects laterally therefrom. An outlet aperture 22 is formed in tube 16, and a discharge conduit 24 is welded to said tube so as to communicate with the interior of housing 10 through this aperture. For the purpose of identification, the portions of the interior of housing 10 below and above partition plate 14 will be referred to hereinafter as gas entry chamber 26 and gas exit chamber 28, respectively.

A plurality of apertures 30 extend through and are spaced apart circumferentially about partition plate 14, and apertures 32 are also formed in end plate 20 so as to respectively coaxially align with said apertures 30. Filter cartridge holding tubes, each generally designated in the drawings by reference number 34, respectively extend in fixed relation through apertures 30 in partition plate 14, the lower portions of the tubes projecting downwardly from the partition plate and the upper portions of the tubes projecting upwardly from the partition plate and being respectively fixed in apertures 32 in end plate 20 with their ends even with the upper surface of said end plate. Circumferentially spaced apart about the portion of each holding tube 34 and located within gas exit chamber 28 are a plurality of flow passages 36.

Figure 3:
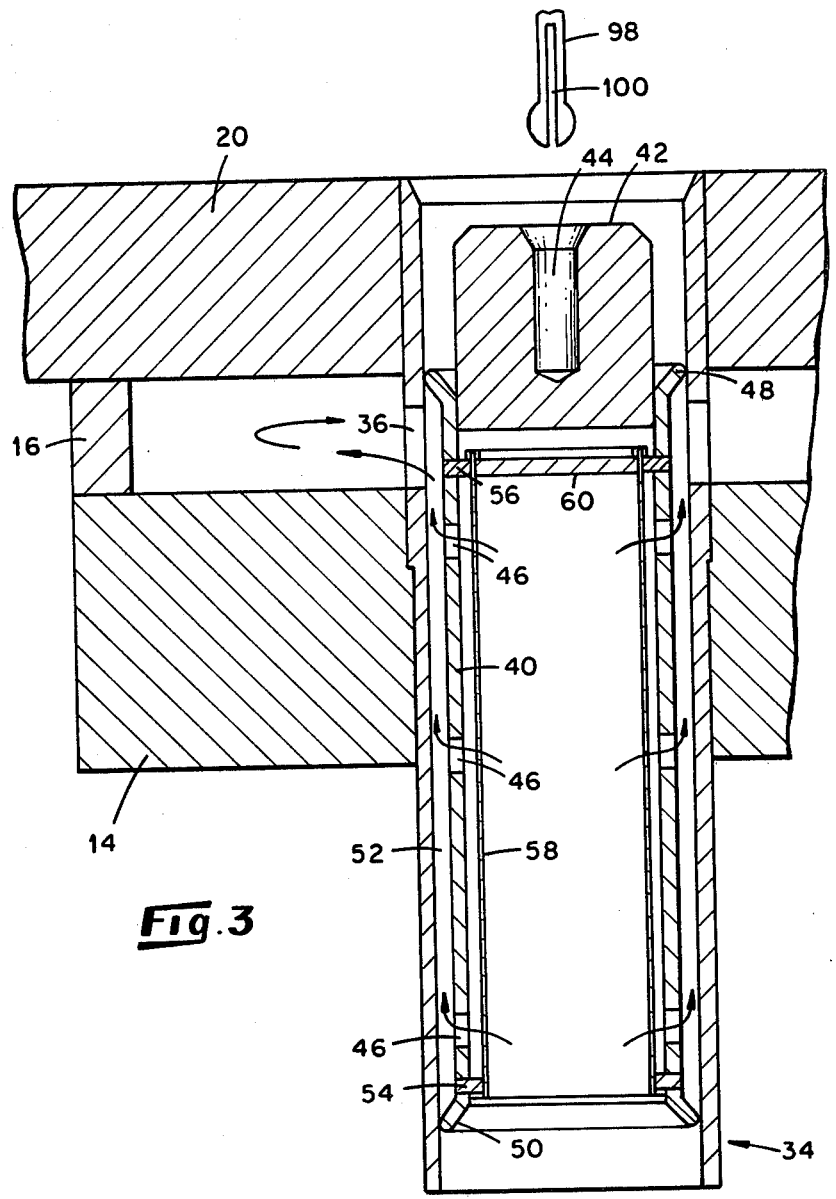
FIG. 3 is a detailed view of certain components illustrated in FIG. 1, a typical filter cartridge of the apparatus being illustrated in section along its longitudinal axis.

As illustrated in greatest detail in FIG. 3, a cylindrical filter cartridge forcibly fits, with plastic flow of the cartridge, by sliding motion in each holding tube 34. For the purpose of identification in the following discussion of the operation of the described filter apparatus, each of the cartridges designated 38a in the drawings are to be considered as being used, whereas cartridges designated 38b are to considered as being unused. Each cartridge comprises a cylindrical outer shell 40 open at one end and closed at its other end by a closure 42. For reasons which will be explained hereinafter, a hole 44 having a generally cylindrical shape is formed in the upper end of closure 42, and spaced apart both longitudinally and circumferentially of outer shell 40 are a plurality of apertures 46. Seal rims 48,50 respectively project laterally from and extend about the upper and lower ends of outer shell 40, these seal rims being sized so that when the cartridge is in a holding tube the seal rims are compressed and deformed, and thus form a gas-tight seal with the wall of the holding tube 34. However, there is an annular space 52 between the tubular section of each cartridge and the holding tube in which it is placed in use. Two filter element support rings 54,56 project radially inward from the wall of outer shell 40 at opposite ends thereof, and a tubular filter element 58 is fixed in, and extends between, these rings. The upper end of filter element 56 is closed by a disk 60. Generally designated by reference number 62 is an assembly for ejecting used filter cartridges 38a from holding tubes 34 and inserting unused filter cartridges 38b therein, this assembly comprising a support plate 64 having bolt apertures 66 (only one of which is illustrated) spaced apart about its perimeter. Bolts 68 provided with retaining pin 70 are respectively disposed in apertures 66 and extend through apertures 72 in end plate 20 of housing 10, and nuts 74 on these bolts clamp support plate 64 against the outer side of said end plate in sealed relation therewith. For a purpose that will be explained hereinafter, a handling element 76 is attached to each nut 74, and each nut conformably fits in a retainer cage 78 fastened to end plate 20. Two alignment pins 80 are anchored in apertures 82 (only one of which is illustrated, in FIG. 1) in end plate 20 and extend into centering holes 84 in support plate 64 when the two plates are clamped together. Plate 64 is thereby positioned so that apertures 86 therein respectively align with apertures 32 in plate 20. Fixedly secured in each aperture 86 is the open lower end of a tubular replacement cartridge holding canister 88. An end cap 90 closes the upper (or free) end of each canister 88, and a screw 92 is threadedly engaged in an aperture centrally located in each end cap, each screw having a hexagonal head 94 on its outer end. The end of each screw 92 which is disposed inside the associated canister 88 has a reduced diameter and is threaded into a hole in the upper end of a cylindrical block 96 slidably fitted in the same canister. One end of a cartridge holding rod 98 is threadedly engaged within a hole in the lower end of each block 96. The other end of each holding rod is spherical and has a spring slot 100 formed therein as illustrated in FIG. 3. A pair of support lugs 102,104 are attached to the upper side of support plate 64 at diametrically opposed points thereon, and the ends of a bail 106 are respectively positioned in apertures in these support lugs.

OPERATION OF THE PREFERRED EMBODIMENT OF THE INVENTION

A mixture of gases containing tritium and particulate fuel material is discharged from a voloxidizer of a nuclear fuel reprocessing system into gas entry chamber 26 of the described preferred embodiment of the invention. As has been noted, this gas contains particulate fuel material which must be recovered. Filter elements 58 in filter cartridges 38a,38b are formed of a previously known material comprised of sintered stainless steel fibers. As represented by arrows in FIG. 3, gaseous tritium flows through the filter elements 58, through the apertures 46 in the outer shells 40 of the filter cartridges, thence through the spaces between said outer shells 40 and the holding tubes 34 to the apertures 36 in the latter, through the last-mentioned apertures into gas exit chamber 28, and finally into discharge conduit 24. However, filter elements 58 in cartridges 34 are impermeable to the particular fuel material in the gas stream, and this material collects at the inner surface of the sleeves.

Bail 106 of filter cartridge ejection assembly 62 can readily be grasped by a moving means such as a crane to shift the cartridge ejection assembly (after removing bolts 68) from its position on plate 20 of housing 10 to a point where replacement filter cartridges 38b can safely be loaded into cartridge holding canisters 88 (the standby position of two replacement cartridges 38b in their canisters 88 being illustrated in FIG. 1). Assembly 62 can be removed while the process is operating, since plate 20 is completely sealed without assembly 62. When replacement cartridges 38b are loaded into holding canister 88, the spherical ends of rods 98 connected to screws 92 snap into holes 44 in end caps 42 of the cartridges, so that the cartridges are held in the canisters by the rods. After replacement cartridges are placed in holding canisters 88, the cartridge ejecting assembly 62 is moved above end plate 20 of housing 10 and then lowered onto the plate with alignment pins 80 on the end plate inserted in the apertures in support plate 64 to align bolt apertures 66 and 72 in the plates. Suitable remote control handling means can then be used to insert the shanks of bolts 68 into the bolt apertures. The handling elements 76 attached to nuts 74 are gripped by a handling means to insert the nuts into retainer cages 78, and bolts 68 are turned by an impact wrench to tighten the nuts thereon and clamp support plate 64 against end plate 20. Screws 92 can now be turned by an impact wrench to lower the screws in holding canisters 88 and thereby push replacement cartridges 38b out of the canisters and into holding tubes 34, which, as illustrated in FIG. 1, pushes used cartridges 38a out of the holding tubes. The used cartridges fall back into the voloxidizer connected to housing 10, so that 100% of fuel material collected therein is returned to the process stream of this material. This can be done while the process is in operation since cartridges 38a and 38b are sealed dynamically throughout the filter change.

The outer shells 40 of the described filter cartridges are formed of a relatively soft metal, and the inside diameter of holding tubes 34 is such that seal rims 48,50 of the outer shells are deformed when the cartridges are inserted in the tubes, thereby creating a gas-tight seal between the rims and the tubes. Furthermore, when a screw 92 attached to a cartridge is turned to move the screw upwardly, the friction between the cartridge and its holding tube 34 is sufficient to hold the cartridge in position as the spherical end of holding rod 98 is drawn out of hole 44 in end cap 42 of the cartridge. By selecting the proper height of gas exit chamber 28, the proper location of the holding tubes and the filter cartridges, replacement filters 38b can push out used filters 38a without permitting gas to escape from said chamber 28 except through outlet aperture 22 and discharge conduit 24 communicating therewith. The arrangement of the components of the disclosed gas filtering apparatus provides the following advantages: (1) a large filter surface area is provided in a compact assembly; (2) filtering efficiency of the apparatus has been found to be high; (3) used filters can conveniently be replaced after they have been contaminated by exposure to radioactive material by the use of simple handling means operated from a remote point; (4) cartridges can be ejected from the apparatus and dropped into a nuclear fuel element reprocessing stream, thus eliminating the necessity for separate disposal of the cartridges; and (5) particulate material can be continuously removed from a gas stream by the apparatus, even while filter cartridges are being changed.

What is claimed is:

1. Apparatus for removing particulate material from a gas stream, comprising:
    a filter cartridge holding tube having at least one aperture in the wall thereof; and
    a filter cartridge comprising:
    (1) an outer shell including a tubular section having an outside diameter less than the inside diameter of said filter cartridge holding tube, a closure extending across one end of said outer shell and the other end of said outer shell being open, a pair of seal rims being spaced apart along the longitudinal axis of said outer shell and projecting laterally from and extending about the periphery of said outer shell, at least one aperture in the wall of said outer shell between said seal rims communicating with the aperture in the holding tube, said seal rims being sized so that they are compressed by said filter cartridge holding tube when said filter cartridge is inserted therein, said aperture in the wall of said filter cartridge holding tube being positioned between said seal rims when said filter cartridge is in an operative position in said filter cartridge holding tube, and
    (2) a tubular filter element closed at an end opposite the open end of the outer shell and fixedly secured to said outer shell and formed of a material permeable to said gas stream but impermeable to particulate material thereon positioned in the flow path between the open end of the outer shell and the aperture therein.

2. The apparatus of claim 1 wherein said filter element is spaced from the wall of said outer shell.

3. The apparatus of claim 1 including:

a housing having a first open end and a second end closed by an end plate, an aperture in said end plate, a partition plate extending across the interior of said housing in spaced, parallel relation with said end plate and dividing said housing interior into a gas entry chamber and a gas exit chamber, an aperture in said partition plate in coaxial alignment with the aperture in said end plate, an outlet in the wall of said housing for releasing gas from said exit chamber, said filter cartridge holding tube being fixedly secured in the apertures in said end plate and partition plate and projecting laterally from the side of said partition plate remote from said end plate, said aperture in the wall of said tubular section of said filter cartridge outer shell being disposed in said exit chamber; and ejection means attachable to said end plate for pushing said filter cartridge out of said filter cartridge holding tube in the direction of said first end of said housing.

4. The apparatus of claim 3 wherein said ejection means comprises a support plate having an aperture therein, means for releasably clamping said support plate against the outer side of said end plate of said housing so that the apertures in said support plate and said end plate are coaxially aligned, a tubular replacement cartridge holding canister fixedly engaged at one end thereon in said aperture in said support plate and projecting laterally from the side of said support plate remote from said end plate when said support plate is attached to said end plate, a replacement filter cartridge in said canister, an end cap secured to the free end of said canister, said end cap having an aperture centrally located therein, and means mounted in said aperture in said end cap for movement axially of said canister to thereby push said replacement cartridge out of said canister and into said filter cartridge holding tube, whereby said filter cartridge in said filter cartridge holding tube is ejected therefrom.

5. The apparatus of claim 4 wherein said means movably mounted in said end cap is a screw.

6. The apparatus of claim 5 including means on said screw for releasably connecting said replacement filter cartridge thereto.

* * * * *